US009283911B2

(12) United States Patent
    Nagasawa (10) Patent No.: US 9,283,911 B2
(45) Date of Patent: Mar. 15, 2016

(54) OCCUPANT PROTECTION DEVICE (71) Applicant: Fuji Jukogyo Kabushiki Kaisha, Tokyo (JP)

(72) Inventor: Isamu Nagasawa, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/457,049

(22) Filed: Aug. 11, 2014

(65) Prior Publication Data
    US 2015/0066308 A1    Mar. 5, 2015

(30) Foreign Application Priority Data
    Aug. 29, 2013 (JP) ................................. 2013-177960

(51) Int. Cl.
    *B60R 21/00*     (2006.01)
    *B60R 21/01*     (2006.01)
    *B60R 21/015*    (2006.01)
    *B60R 21/231*    (2011.01)

(52) U.S. Cl.
    CPC ......... *B60R 21/015* (2013.01); *B60R 21/01534* (2014.10); *B60R 21/01536* (2014.10); *B60R 21/01538* (2014.10); *B60R 21/01552* (2014.10); *B60R 21/231* (2013.01); *B60R 2021/0051* (2013.01); *B60R 2021/0053* (2013.01); *B60R 2021/0055* (2013.01); *B60R 2021/0157* (2013.01); *B60R 2021/01566* (2013.01); *B60R 2021/23107* (2013.01); *B60R 2021/23169* (2013.01)

(58) Field of Classification Search
    USPC ......... 701/45–49; 280/728.1, 734–735, 730.1
    See application file for complete search history.

(56) References Cited

U.S. PATENT DOCUMENTS

| 2,834,606 | A | 5/1958 | Bertrand |
| 6,092,836 | A * | 7/2000 | Saslecov ..................... 280/730.1 |
| 6,217,059 | B1 | 4/2001 | Brown et al. |
| 7,090,245 | B2 | 8/2006 | Yoshikawa et al. |
| 7,669,897 | B2 * | 3/2010 | Sano .............................. 280/752 |
| 8,376,396 | B2 * | 2/2013 | Miller et al. ................... 280/729 |
| 8,894,095 | B1 * | 11/2014 | Meister et al. ............. 280/730.2 |
| 2002/0149187 | A1 * | 10/2002 | Holtz et al. .................... 280/749 |
| 2003/0141709 | A1 * | 7/2003 | Honda et al. .............. 280/730.2 |
| 2006/0028004 | A1 * | 2/2006 | Oota et al. ..................... 280/733 |
| 2006/0212989 | A1 * | 9/2006 | White ................................ 2/159 |
| 2007/0075919 | A1 * | 4/2007 | Breed ................................ 345/8 |
| 2007/0296192 | A1 * | 12/2007 | Sano .............................. 280/743.1 |
| 2009/0121462 | A1 * | 5/2009 | Rick .............................. 280/729 |
| 2015/0061268 | A1 | 3/2015 | Nagasawa |

FOREIGN PATENT DOCUMENTS

| JP | 2005-067273 | 3/2005 |
| JP | 2011-213195 | 10/2011 |

\* cited by examiner

*Primary Examiner* — Yonel Beaulieu
(74) *Attorney, Agent, or Firm* — Smith, Gambrell & Russell, LLP (57) ABSTRACT

A controller of an occupant protection device identifies the positions of the lower legs of an occupant seated in a seat based on detection signals of sensor modules, and controls the expansion states of airbag modules for lower legs as to the identified positions of the lower legs to support the lower legs of the occupant in the identified positions of the lower legs using the expanded airbag modules for lower legs.

19 Claims, 7 Drawing Sheets

OCCUPANT PROTECTION DEVICE

CROSS-REFERENCE TO RELATED APPLICATIONS

The present application claims priority from Japanese Patent Application No. 2013-177960 filed on Aug. 29, 2013, the entire contents of which are hereby incorporated by reference.

BACKGROUND

1. Technical Field

The present invention relates to an occupant protection devices that protect an occupant in a vehicle, such as an automobile.

2. Related Art

A seatbelt module and airbag modules are employed for an occupant protection device (see Japanese Unexamined Patent Application Publication (JP-A) Nos. 2011-213195 and 2005-067273). The seatbelt module is used for restraining an occupant seated in a seat of the vehicle to the seat. The airbag modules are used for expanding an airbag between a structural object such as the steering wheel, instrument panel, or side panel of the vehicle, and the occupant so as to prevent the upper body of the occupant, such as the head, from beating against the structural object.

The airbag modules include an airbag module for the lower legs of an occupant. The airbag module for lower legs according to JP-A No. 2011-213195 expands from the instrument panel to the below-knee portions of the occupant seated in the seat of the vehicle. The airbag module for lower legs expands, which prevents the below-knee portions (lower legs) of the occupant from moving forward at the time of a collision. Thus, the below-knee portions of the occupant are not in contact with the instrument panel. Impact to the lower legs in the case that the below-knee portions of the occupant move to a position which is in contact with the instrument panel can be suppressed.

Collision experiments using crash test dummies have shown that such an occupant protection device very effectively suppresses bodily damage at the time of a collision. However, there has been demand for further improvement in occupant protection devices.

For example, even if the airbag module for lower legs has been expanded at the time of a collision, there remains space at the feet on the lower side of the airbag module for lower legs where the expanded airbag module does not reach. The lower legs of the occupant may move forward through the space at the feet. Also, the position of the upper body of the occupant may drop lower from the seated position before the collision, due to the lower leas of the occupant moving forward from the seated position before the collision.

Thus, although the occupant protection devices yield fairly high occupant protection effects, there has been demand for occupant protection devices having more exact occupant protection effects.

SUMMARY OF THE INVENTION

An aspect of the present invention provides an occupant protection device including: a plurality of airbag modules including an airbag module for lower legs that expands toward the lower legs of an occupant seated in a seat of a vehicle; a controller that controls the plurality of airbag modules; and a sensor module that detects the occupant seated in the seat. The controller is connected with the sensor module, identifies the positions of the lower legs of the occupant seated in the seat based on a detection signal of the sensor module, and controls the expanded state of the airbag module for lower legs as to the identified positions of the lower legs to support the lower legs of the occupant in the identified positions of the lower legs.

The plurality of airbag modules may include a below-knee airbag module that expands toward the below-knee portions of the occupant seated in the seat. The controller may identify the positions of the below-knee portions of the occupant seated in the seat as the positions of the lower legs based on the detection signal of the sensor module, and expand the below-knee airbag module toward the identified positions of the below-knee portions to support the below-knee portions of the occupant in the identified positions of the below-knee portions by the expanded below-knee airbag module.

The plurality of airbag modules may include, as the lower leg airbag modules, a front airbag module that expands backward on the front side of the below-knee portions of the occupant seated in the seat, and a rear airbag module that expands forward on the rear side of the below-knee portions of the occupant seated in the seat. The controller may identify the positions of the below-knee portions of the occupant seated in the seat as the positions of the lower legs based on the detection signal of the sensor module, and expand the front airbag module and the rear airbag module from the front and rear toward the identified positions of the below-knee portions to restrain the below-knee portions of the occupant in the identified positions of the below-knee portions from the front and rear using the expanded front airbag module and the expanded rear airbag module.

The front airbag module and the rear airbag module may restrain two portions including at least the knees out of the knees, shins, and ankles of the occupant.

The sensor module may include a pair of sensor modules provided to a structural object of the vehicle in the vicinity of the seat arrayed in the horizontal direction. The controller may identify the positions of the below-knee portions of the occupant seated in the seat by computation of triangulation employing detection signals of the pair of sensor modules and the relative positions of the pair of sensor modules.

The sensor module may include at least one sensor module selected out of a sensor module that detects the positions of the front of the knees, shins, or ankles of the occupant seated in the seat, a sensor module that detects the positions of the rear faces of the knees, shins, or ankles of the occupant seated in the seat, a sensor module that detects the position of the seat within cabin, and a sensor module that detects a body pressure distribution of the occupant seated in the seat. The controller may identify the positions of the lower legs of the occupant seated in the seat based on the detection signal of at least one of the sensor modules.

The sensor module may include a sensor that detects the position of the occupant in a noncontact manner, such as an infrared sensor, an ultrasonic sensor and an image sensor.

DETAILED DESCRIPTION

Hereinafter, implementations of the present invention will be described with reference to the drawings.

First Implementation

Figure 1:
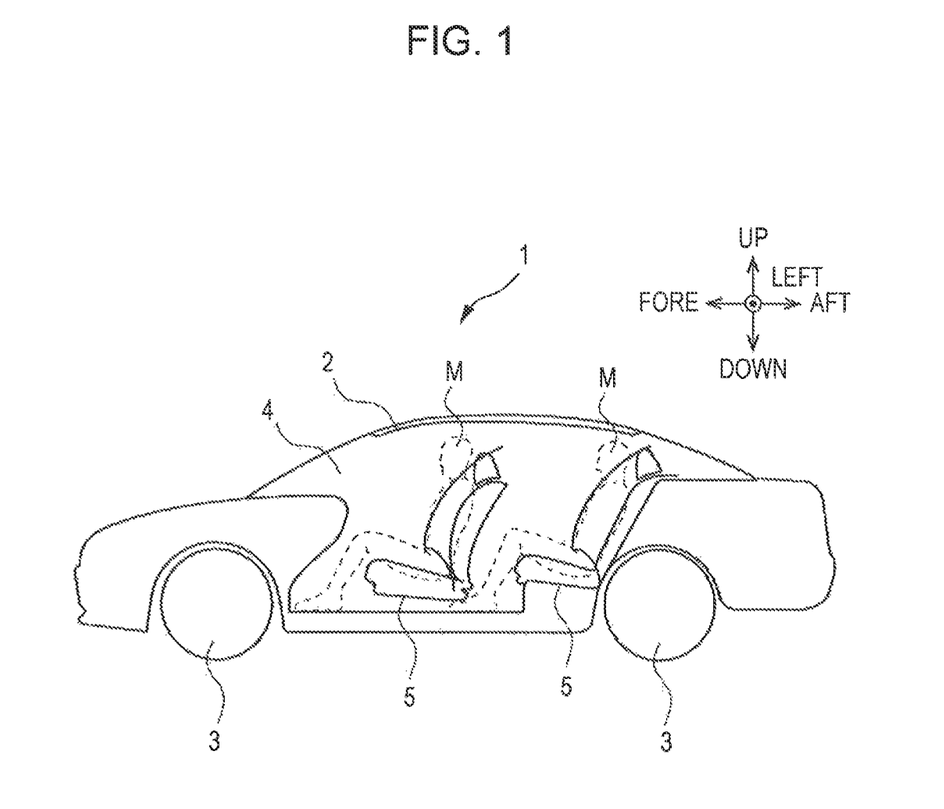
FIG. 1 is an explanatory diagram illustrating a passenger vehicle including an occupant protection device according to a first implementation of the present invention.

FIG. 1 is an explanatory diagram illustrating a passenger automobile 1 including an occupant protection device 10 according to a first implementation of the present invention. The passenger automobile 1 is a multiple passenger vehicle in which a driver and other passengers can ride. This automobile is an example of a vehicle. Hereinafter, fore, aft, left, right, up, and down will be used with the vehicle in FIG. 1 as a reference.

The passenger automobile 1 in FIG. 1 includes a vehicle body 2. The vehicle body 2 in FIG. 1 is configured with the front, middle, and rear portions. Tires 3 are disposed at the front and rear portions of the vehicle body 2.

A cabin 4 for an occupant M to ride in is formed in the middle portion of the vehicle body 2. Seats 5 for the driver and other passengers to sit on are disposed in two rows, front and back. The cabin 4 has a skeleton structure in which multiple frame members are combined in a box frame shape. The cabin 4 does not readily collapse, due to this skeleton structure.

A frame member which is not illustrated in FIG. 1 extending forward from the skeleton structure of the cabin 4 is disposed in the front portion of the vehicle body 2. The frame member may have a hollow structure which buckles under impact of a collision, to absorb the impact. The frame member supports, for example, a combustion engine, an electric motor, a battery, and tires 3, which are disposed at the front portion of the vehicle body 2. The passenger automobile 1 may employ the combustion engine as the main power source, or may be an electric vehicle with the electric motor as the main power source, or may be a hybrid vehicle with both of those as power sources.

A luggage compartment is formed in the rear portion of the vehicle body 2. A frame member which is not illustrated in FIG. 1 extending from the skeleton structure of the cabin 4 to the back is disposed in the rear portion of the vehicle body 2. The frame member may have a hollow structure which suitably buckles at the time of a collision to readily absorb impact. The frame member supports, for example, a spare tire, a battery for electric vehicle, and tires 3, which are disposed at the rear portion of the vehicle body 2.

Figure 2:
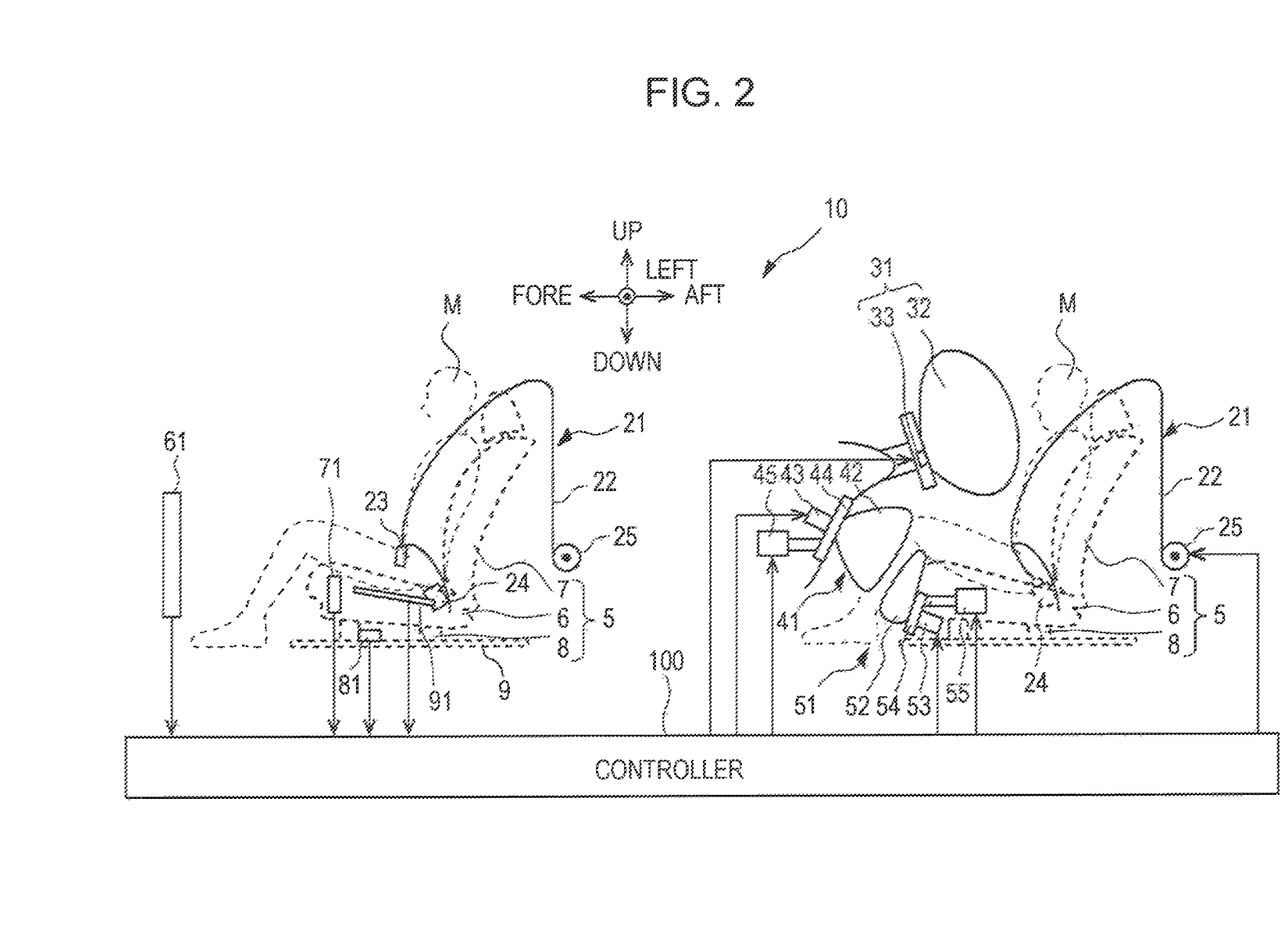
FIG. 2 is an explanatory diagram illustrating the occupant protection device mounted on the vehicle in FIG. 1.

FIG. 2 is an explanatory diagram illustrating the occupant protection device 10 mounted on the vehicle in FIG. 1. The occupant protection device 10 is installed in the cabin 4. FIG. 2 illustrates the seat 5 disposed in the cabin 4 of the passenger automobile 1, and the occupant M seated in the seat 5. Note that, for clarity, the same seat 5 in which the same occupant M is seated is illustrated in two portions on the left and right in FIG. 2.

The seat 5 has a cushion part 6 having a generally rectangular seat surface, a back part 7 erected from one side of the cushion part 6, and a leg part 8 protruding downward from the cushion part 6. The occupant M sits on the cushion part 6, and rests the back against the back part 7. The occupant M is thus seated in the seat 5.

The leg part 8 of the seat 5 is slidably attached to a seat rail 9. The seat rail 9 extends on the floor surface in the cabin 4 in the fore-and-aft direction. The seat rail 9 is fixed to the skeleton structure of the vehicle body 2. The seats 5 are movable in the fore-and-aft direction, and are fixable at the position to which they have moved. Also, the seats 5 may be configured so as to adjust the height of the cushion part 6 from the floor surface, and the inclination angle of the back part 7. Thus, for example, the driver can readily operate the steering wheel, brakes, and so forth, and sit in the seat 5 in the optimal seated position corresponding to each body type or the preference.

The occupant protection device 10 in FIG. 2 includes a seatbelt module 21, multiple airbag modules 31, 41, and 51, multiple sensor modules 51, 71, 81, and 91, and a controller 100.

The seatbelt module 21 is a mechanism to restrain the occupant M seated in the seat 5 to the seat 5. The seatbelt module 21 includes a seatbelt. 22, a tongue plate 23, a buckle 24, and a retractor 25.

The seatbelt 22 is a slender and long belt. One end of the seatbelt 22 is fixed to the side face on the outer side in the horizontal direction of the cushion part 6, for example. The other end of the seatbelt 22 is fixed to the retractor 25.

The retractor 25 releases, holds, and rewinds the seatbelt 22. The retractor 25 is fixed to a skeleton member making up the cabin 4. Examples of the skeleton member include what is called a B pillar.

The tongue plate 23 is passed through the seatbelt 22. The buckle 24 is detachably engaged with the tongue plate 23. The buckle 24 is fixed to the side face on the inner side in the horizontal direction of the cushion part 6, for example.

In a normal state in which the retractor 25 releases the seatbelt 22, the occupant M sits in the seat 5, pulls out the tongue plate 23, and engages the tongue plate 23 with the buckle 24 so that the seatbelt 22 runs in front of the upper body. Thus, a portion of the seatbelt 22 runs around the waist front of the occupant M seated in the seat 5. Another portion of the seatbelt 22 obliquely runs from the waist to shoulder of the occupant M seated in the seat 5. In this state, the retractor 25 rewinds and holds the seatbelt 22 in response to an activation signal from the controller 100. The occupant M seated in the seat 5 is restrained by the seat 5. Note that there is also used a four-point type as the seatbelt module 21, other than the above three-point type.

The airbag modules 31, 41, and 51 are modules to expand between the occupant M seated in the seat 5 and a structural object of the vehicle, such as the steering wheel or the like, so as to prevent the occupant M seated in the seat 5 from being hit on the structural object of the vehicle, such as the steering wheel or the like. The airbag modules 31, 41, and 51 include an airbag and an inflator.

The airbag is a bag which is expandable by injection of high-pressure gas. The inflator preserves high-pressure gas. The high-pressure gas of the inflator is injected into the airbag, thereby expanding the airbag. The shape of the expanded airbag is designed as appropriate according to the installation location, expanding direction, and expanded range of each of the airbag modules 31, 41, and 51.

The occupant protection device 10 in FIG. 2 includes a steering wheel airbag module 31, left and right pair of front airbag modules 41, and left and right pair of rear airbag modules 51, as multiple airbag modules.

The steering wheel airbag module 31 is disposed in the steering wheel. A front upper airbag 32 and a front upper inflator 33 are housed in the steering wheel. The front upper inflator 33 injects the high-pressure gas into the front upper airbag 32 in response to the activation signal from the controller 100. The front upper airbag 32 expands between the face of the occupant M and the steering wheel. Thus, the upper body, such as the face, chest, or the like, of the occupant M which moves forward at the time of a collision can be prevented from striking against the steering wheel.

The front airbag module 41 is disposed in the lower portion of the instrument panel. A front lower airbag 42 and a front lower inflator 43 are disposed in the lower portion of the instrument panel. The left and right pair of front airbag modules 41 are provided horizontally arrayed in the lower portion of the instrument panel. The front lower inflator 43 injects the high-pressure gas into the front lower airbag 42 in response to the activation signal from the controller 100. The front lower airbag 42 expands between the instrument panel and seat 5. The front airbag module 41 expands in the backward direction on the front side of the below-knee portions of the occupant, seated in the seat 5. Thus, the below-knee portions, such as the knees, shins, ankles, and so forth, of the occupant M do not readily move forward at the time of a collision. As a result thereof, the knees and ankles of the occupant M do not readily move to an extent of coming into contact with the instrument panel or toeboard. Strong impact at the time of a collision is not readily applied to the knees or ankles by coming into contact with the instrument panel or toeboard.

Thus, the occupant protection device 10 in FIG. 2 is quite effective in suppressing bodily damage to the occupant at the time of a collision, for example, in a collision experiment employing a crash test dummy using the steering wheel airbag module 31 to expand in the face direction from the steering wheel, and the left and right pair of front airbag modules 41 to expand in the direction of the below-knee portions from the instrument panel.

However, there has been demand for further improvement of the occupant protection device 10. For example, even when expanding the front airbag module 41 at the time of a collision, there remains space at the feet where the front airbag module 41 is not expanded. There is a possibility that the lower legs of the occupant M will move forward though the space at the feet. If the lower legs of the occupant M come into contact with the toeboard on the front side of the instrument panel, there is a possibility that a moment damage will occur at the lower legs of the occupant M due to the load received from the toeboard.

In addition to this, for example, there is a possibility that the lower legs of the occupant M will move forward at the time of a collision, which lowers the position of the upper body of the occupant M. The seatbelt 22 restrains the waist or a predetermined chest position of the occupant M in a state in which the occupant M is seated in the seat 5, thereby protecting the occupant M from obstacles. However, there is a possibility that this function is not readily manifested, due to the position of the upper body of the occupant M dropping lower.

Therefore, in order to obtain exact protection effects of the occupant M, the present implementation employs the sensor modules to detect the body type, physique, and seated posture of the occupant M, the movable front airbag module 41, and the movable rear airbag module 51. The controller 100 identifies the seated positions of the lower legs of the occupant M based on the detection signal of the sensor module, and controls the expanded states of these airbag modules so as to expand the front airbag module 41 and rear airbag module 51 with the identified seated positions as a reference. The below-knee portions of the occupant M are restrained by the front airbag module 41 and rear airbag module 51. Hereinafter, this will be described in detail.

The movable front airbag module 41 includes, in addition to the front lower airbag 42 and front lower inflator 43, a front movable plate 44, and a front actuator 45. The front lower airbag 42 and front lower inflator 43 are fixed to the front movable plate 44.

The front lower airbag 42 may have the same approximately cubic shape as that of the normal airbag module for lower legs, but more preferably have a generally U-letter shape with a vertically long cross section enveloping the lower legs from the front, left, and right sides.

The front movable plate 44 has, for example, a rectangular plate shape which is longer in the horizontal direction. The front movable plate 44 is provided movably in a direction toward the front side of the seat 5 from the lower portion of the instrument panel. The front lower airbag 42 and front lower inflator 43 are fixed to the vehicle body 2 so as to be moved by the front movable plate 44. The front lower airbag 42 is provided to a desired position, and is capable of expanding to a desired direction and range further from the desired position thereof. Adjusting the fore-and-aft position of the front movable plate 44 enables the expanded range of the front lower airbag 42 to be adjusted back and forth.

The front actuator 45 controls the position of the front movable plate 44. The front actuator 45 may be a motor, for example. The front actuator 45 controls the position of the front movable plate 44 to be positioned at the fore-and-aft position. Controlling the fore-and-aft position of the front movable plate 44 enables the fore-and-aft position and rage within the cabin 4 regarding the expanded front lower airbag 42 to be adjusted.

The movable rear airbag module 51 is expanded between the front face of the seat 5 and the below-knee portions of the occupant M. The rear airbag module 51 is expanded forward on the rear side of the below-knee portions of the occupant M seated in the seat 5. Thus, the below-knee portions such as the ankles and so forth of the occupant M at the time of a collision do not readily move backward so as to come into contact with the cushion part 6.

The rear airbag module 51 includes, in addition to the rear airbag 52 and rear inflator 53, a rear movable plate 54, and a rear actuator 55. The rear airbag 52 and rear inflator 53 are fixed to the rear movable plate 54. The rear airbag 52 may have, for example, a generally U-letter shape with a vertically long cross section enveloping the lower legs from the rear, left, and right sides.

The rear movable plate 54 of the rear airbag module 51 is disposed between the cushion part 6 of the seat 5, and the floor surface of the cabin 4. The rear movable plate 54 has, for example, a rectangular plate shape long in the horizontal direction, and is provided movably from the front edge to the backward of the cushion part 6. The rear movable plate 54 is movable in the fore-and-aft direction. Also, the rear movable plate 54 may be rotatable under the cushion part 6, for example, like a footrest.

The rear actuator 55 of the rear airbag module 51 controls the position of the rear movable plate 54 to the fore-and-aft direction to perform positioning. Thus, the expanding position and range of the rear airbag 52 which is expanded behind the below-knee portions of the occupant M seated in the seat 5 can be adjusted in the fore-and-aft direction. The position and range of the rear airbag 52 which is expanded behind the cushion part 6 can be adjusted.

Note that the expanded ranges and positions of the expanded airbags 42 and 52, that is, the expanded states may be realized by a method other than a method for controlling the positions of the above movable plates 44 and 54. For example, controlling the amount of high-pressure gas to be injected from the inflators 43 and 53 to the airbags 42 and 52 enables the expanded states of the airbags 42 and 52 to be adjusted. Further, an arrangement may be made in which multiple airbags having a different expanded size or shape are arrayed and some airbags of these are expanded. These techniques may be used in combination.

The sensor modules 61, 71, 81, and 91 are modules to detect the occupant M seated in the seat 5. The sensor modules 61, 71, 81, and 91 detect, for example, the positions of both knees of the occupant M, the positions of both shins, the positions of both ankles, and the seated position in the cushion part 6 of the seat 5. In this case, the sensor modules include a pair of seat front sensor module 61, a pair of seat rear sensor module 71, a seated position sensor module 81, and a body-pressure sensor module 91. The sensor modules 61, 71, 81, and 91 are connected with the controller 100, and output a detection signal to the controller 100.

The seat front sensor module 61 is a sensor module to detect the positions of the knees, shins, and ankles of the occupant M seated in the seat 5, that is, the positions of the below-knee portions from the front in a noncontact manner. The seat front sensor module 61 includes, for example, an infrared sensor, ultrasonic sensor, thermal sensor, or image sensor. In the case of detecting the below-knee portions, for example, the front of the knees and the front of the ankles separately, the seat front sensor module 61 has to be a sensor array in which multiple infrared sensors are arrayed in the vertical direction, for example. Separately detecting the front of the knees and the front of the ankles enables the positions of the front of the knees, and the positions of the front of the ankles to be accurately identified, and also enables the lengths of the front of the shins, the positions of the front of the shins, and the angles of the front of the shins, to be identified by computation.

Figure 3:
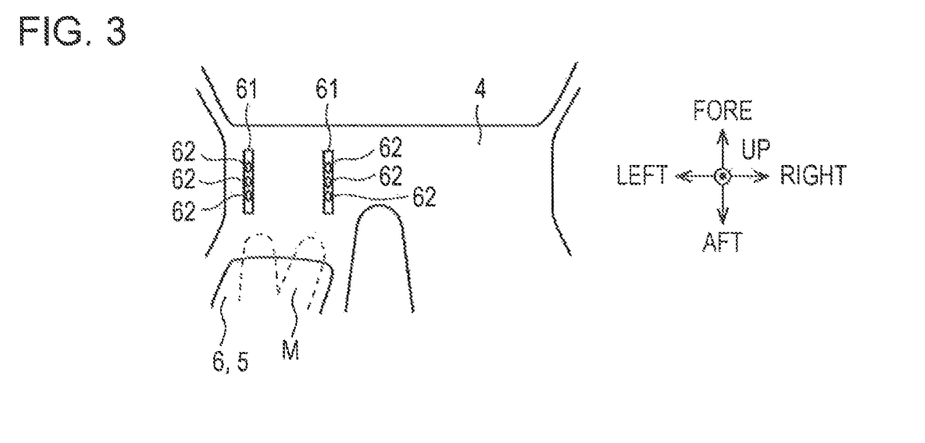
FIG. 3 is a diagram illustrating a layout in the cabin of a pair of seat front sensor modules.

FIG. 3 is a diagram for describing a layout at the cabin 4 of the pair of seat front sensor modules 61. The pair of seat front sensor modules 61 in FIG. 3 are provided in a manner divided into the left and right in the forward direction of the cushion part 6 of the seat 5. The pair of seat front sensor modules 61 on the left side in FIG. 3 are provided backwards in the lower portion of the A pillar making up the cabin 4, for example. The right-side seat front sensor module 61 is provided backwards in a tunnel part formed in the floor surface, for example. Alternatively, the right-side seat front sensor module 61 may be provided backwards in the central part of the instrument panel. Attaching the pair of seat front sensor modules 61 to those positions makes it difficult for an obstacle to become interposed between the pair of seat front sensor modules 61, and left and right pair of the below-knee portions of the occupant M. The pair of seat front sensor modules 61 can detect the positions of the front of the below-knee portions of the occupant M seated in the seat 5 in a sure manner.

Also, each seat front sensor module 61 includes a sensor allay in which three infrared sensors 62 are arrayed in the vertical direction. Thus, there can be detected separately the left and right pair of below-knee portions of the occupant M, for example, the positions of the front of the knees, the positions of the front of the shins, and the positions of the front of the ankles. In this case, as illustrated with a dashed dotted line illustrated in later-described FIG. 4, the positions of the knees, shins, and ankles in the cabin 4 can be identified from an interval of the left and right pair of sensors, and detected distance to the below-knee portions by each sensor, using computation based on triangulation. The positions of the below-knee portions can be identified.

Figure 4:
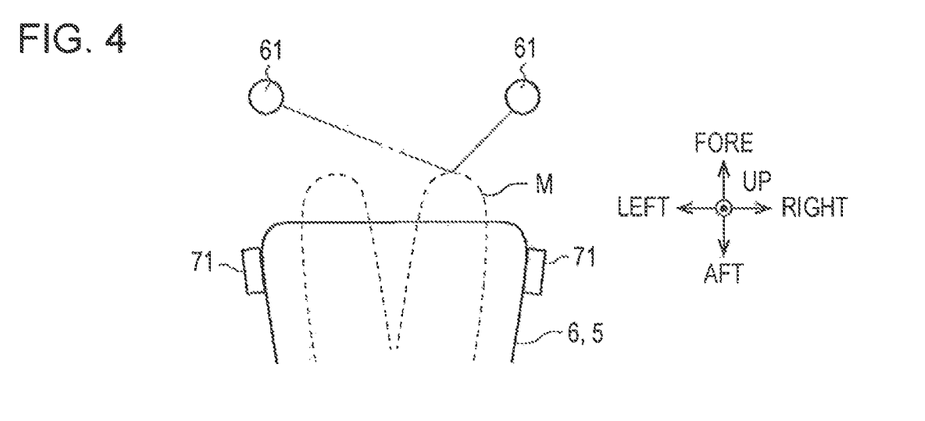
FIG. 4 is a diagram illustrating a layout in the cabin of a pair of seat rear sensor modules.

The seat rear sensor module 71 is a sensor module to detect the positions of the below-knee portions from the knees to the ankles of the occupant M seated in the seat 5 from the back in a noncontact manner. The seat rear sensor module 71 includes, for example, an infrared sensor, ultrasonic sensor, thermal sensor, or image sensor. The seat rear sensor module 71 includes a sensor array in which multiple infrared sensors are arrayed in the vertical direction, for example.

FIG. 4 is a diagram for describing a layout in the cabin 4 of the pair of seat rear sensor modules 71. The pair of seat rear sensor modules 71 are provided to the left and right side faces of the cushion part 6 of the seat 5. Attaching the pair of seat rear sensor modules 71 to those positions makes it difficult for an obstacle to become interposed between the pair of seat rear sensor modules 71, and left and right pair of the below-knee portions of the occupant M. The pair of seat rear sensor modules 71 can detect the positions of the rear faces of the below-knee portions of the occupant M seated in the seat 5 in a sure manner. In this case, the pair of seat rear sensor modules 71 are provided to the seat 5 which is movable back and forth within the cabin 4, whereby the relative positions of the below-knee portions as to the seat 5 can be identified by computation based on triangulation.

Figure 5:
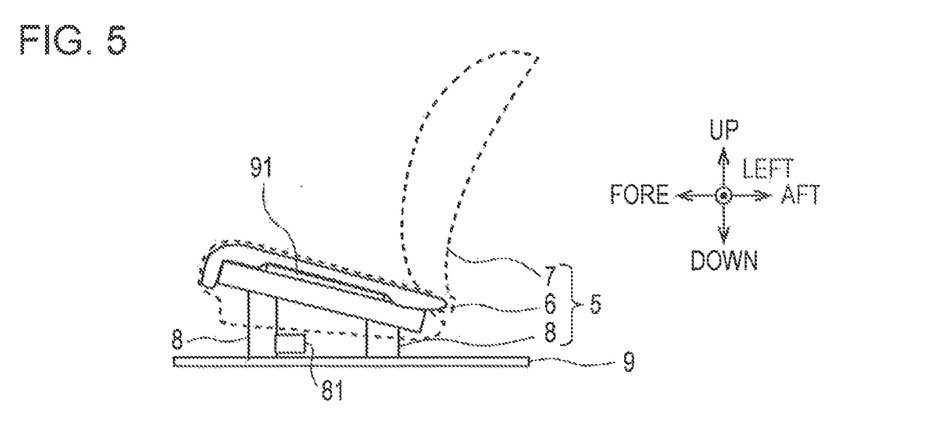
FIG. 5 is an explanatory diagram of a layout in the cabin of a seated position sensor module and a body pressure distribution sensor module.

The seated position sensor module 81 is a sensor module to detect the fore-and-aft position of the seat 5 on the seat rail 9. The seated position sensor module 81 includes, for example, a position sensor to read a position on the seat rail 9.

FIG. 5 is an explanatory diagram of a layout in the cabin 4 of the seated position sensor module 81 and body pressure distribution sensor module 91. In FIG. 5, the seated position sensor module 81 is disposed in the leg part 8 of the seat 5. Using the fore-and-aft position of the seat 5 that the seat position sensor module 81 detects enables the absolute positions of the below-knee portions in the cabin 4 to be identified from the relative positions of the below-knee portions as to the seat 5.

The body pressure distribution sensor module 91 is a sensor module to detect the body pressure distribution of the occupant M seated in the cushion part 6 of the seat 5. The body pressure distribution sensor module 91 includes, for example, a seat 5-shaped pressure distribution sensor. This pressure distribution sensor is interposed between the seat frame and the cushion member as illustrated in FIG. 5, thereby enabling a pressure distribution due to the body weight of the occupant M to be detected.

The body pressure distribution of the cushion part 6 that the body pressure distribution sensor module 91 detects is used as data to predict the behavior of the occupant M at the time of a collision. For example, in the case that the occupant M sits unevenly to either one of the left and right parts of the cushion part 6, the load of the human body unevenly affects both sides so that the biased side becomes higher. Detecting the bias of this load as the bias of the body pressure distribution enables the expanded states of the left and right pair of front airbag modules 41 to be controlled separately on the left and right sides. For example, increasing the amount of injection at the front airbag module 41 on the biased side as to the occupant M seated in a biased manner enables the same high obstacle prevention effect as that of the occupant M seated normally to be expected.

The controller 100 is, for example, a microcomputer. The passenger automobile 1 includes an engine control unit (ECU). The controller 100 may be a microcomputer for the ECU. The controller 100 is connected with the multiple sensor modules 61, 71, 81, and 91, the retractor 25 of the seatbelt module 21, and the inflators 33, 43, and 53 and actuators 45 and 55 of the multiple airbag modules 31, 41, and 51.

Figure 6:
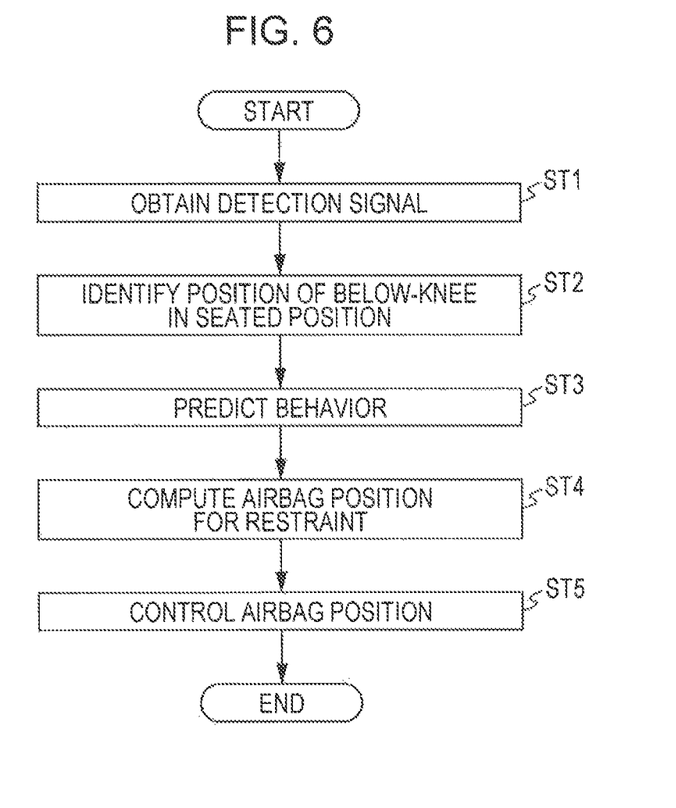
FIG. 6 is a flowchart illustrating adjustment control by a controller.

FIG. 6 is a flowchart illustrating adjustment control by the controller 100. The controller 100 repeatedly executes the processing in FIG. 6 during normal driving or at the time of predicting a collision.

Upon having obtained detection signals from the multiple sensor modules (step ST1), the controller 100 identifies the positions of below-knee portions from the knees to ankles of the occupant M seated in the seat 5 from the detection signals thereof (step ST2), and predicts the behavior of the occupant M at the time of a collision (step ST3).

For example, the controller 100 identifies the positions of the front of the below-knee portions of the seated occupant M by computation of triangulation, based on the detection signals of the pair of seat front sensor modules 61. The controller 100 identifies the positions of the rear faces of the below-knee portions of the seated occupant M by computation of triangulation or the like based on the detection signals of the pair of seat rear sensor modules 71 and the detection signals of the seated position sensor module 81. Also, the controller 100 computes the load distributions on the left and right sides based on the detection signals of the body pressure sensor module 91.

Note that, for example, in the case that the sensor modules 61 and 71 scanning the cabin 4, the controller 100 may extract signal components relating to the below-knee portions of the occupant M from the detection signals obtained from the sensor modules 61 and 71 before identifying the seated position of the occupant M.

In this case, the controller 100 may compute difference between signal components when the occupant M is absent and the detected signal components to identify the signal components of the difference thereof as signal components due to the below-knee portions of the occupant M.

After identifying the seated position of the occupant M, and so forth, the controller 100 computes the fore-and-aft position of the movable front airbag module 41, and the fore-and-aft position of the rear airbag module 51 (step ST4). For example, the controller 100 computes the fore-and-aft position of the front airbag module 41 so that the rear portion of the expanded front lower airbag 42 is positioned at the positions of the front of the identified below-knee portions (e.g., knee and shin).

The controller 100 computes the fore-and-aft position of the rear airbag module 51 so that the front portion of the expanded rear airbag 52 is positioned at the positions of the rear faces of the identified below-knee portions (e.g., knee and shin).

After computing the adjusted positions as to the expanded positions of the airbags 42 and 52, the controller 100 outputs a control signal to the actuators 45 and 55. Thus, the fore-and-aft positions of the front airbag module 41 and rear airbag module 51 have been adjusted to the positions corresponding to the identified positions of the below-knee portions, and the behavior of the occupant M at the time of a collision (step ST5).

For example, the fore-and-aft position of the front movable plate 44 is adjusted and positioned at the front airbag module 41 by the control of the front actuator 45 based on the control signal of the controller 100 so that the rear face of the expanded front lower airbag 42 is overlapped on the identified positions of the front of the below-knee portions.

The fore-and-aft position of the rear movable plate 54 is adjusted and positioned at the rear airbag module 51 by the control of the rear actuator 55 based on the control signal of the controller 100 so that the front face of the expanded rear lower airbag 52 is overlapped on the identified positions of the rear faces of the below-knee portions.

Figure 7:
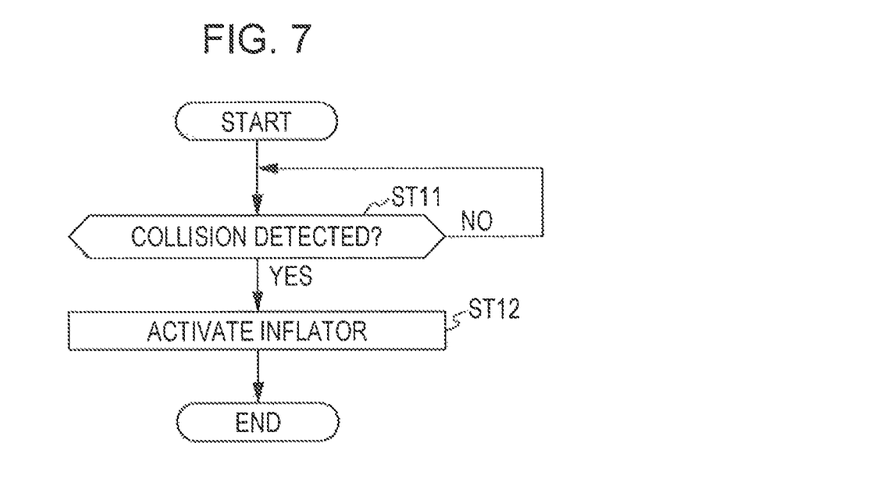
FIG. 7 is a flowchart illustrating control at the time of a collision by the controller.

FIG. 7 is a flowchart illustrating control at the time of a collision by the controller 100. The controller 100 executes the processing in FIG. 7 based on a collision detection signal by an acceleration sensor which is not illustrated, or the like. Also, the controller 100 may execute the processing in FIG. 7 based on a collision predicted signal from a peripheral monitoring device mounted on the vehicle, or the like.

Upon having detected a collision based on the detection signal or the like (step ST11), the controller 100 outputs an activation signal to the retractor 25 and multiple inflators 33, 43, and 53 (step ST12).

According to reception of the activation signal, the retractor 25 of the seatbelt module 21 rewinds and holds the seatbelt 22. Thus, the occupant M is restrained to the seat 5 by the seatbelt 22.

According to reception of the activation signal, the inflators 33, 43, and 53 of the airbag modules release high-pressure gas to the airbags 32, 42, and 52, thereby expanding the airbags 32, 42, and 52. Thus, the expanded airbags 32, 42, and 52 are interposed between the occupant M and a structural object of the vehicle.

Also, the front lower airbag 42 of the front airbag module 41, and the rear airbag 52 of the rear airbag module 51 are exposed from the adjusted position. The below-knee portions of the seated occupant M are restrained to the identified positions of the below-knee portions before a collision from the front and rear by these airbags 42 and 52.

Note that, in FIGS. 6 and 7, in a normal state in which no collision occurs, the controller 100 adjusts the fore-and-aft position of the front movable plate 44 of the front airbag module 41, and the fore-and-aft position of the rear movable plate 54 of the rear airbag module 51, and in the case of having detected a collision, expands the airbags 42 and 52. In addition to this, for example, in the case of having predicted that a collision is likely to occur, the controller 100 may adjust the fore-and-aft position of the front movable plate 44 of the front airbag module 41, and the fore-and-aft position of the rear movable plate 54 of the rear airbag module 51.

Also, in the case of adjusting the expanded states of the airbags 42 and 52 using the amount of injection of high-pressure gas from the inflators 43 and 53 to the airbags 42 and 52 instead of the above position adjustment, the controller 100 instructs the inflators 43 and 53 the amount of injection. The amount of injection in this case has to be determined based on the expanded amount of the airbags 42 and 52 used for expanding the airbags to the identified positions of the below-knee portions.

Also, in the case of adjusting the exposed states of the airbags 42 and 52 by selecting an airbag from multiple airbags having a different exposed size or shape, the controller 100 holds the selected information of the airbag, and at the time of detection of a collision, has to output an activation signal to only the inflator corresponding to the selected airbag.

Also, the controller 100 may output a different activation signal to the multiple airbag modules 31, 41, and 51 instead of the same activation signal. In particular, the activation signal of the front lower inflator 43 as to the front airbag module 41, and the activation signal of the inflator 53 as to the rear airbag module 51 may be slightly shifted at timing. Even when the timing is shifted between the activation signals, it is not changed that the lower legs of the occupant M can be restrained from the front and rear.

As described above, at the time of detection of a collision, the below-knee portions (e.g., knee and shins) of the occupant M are restrained from the front and rear by the front airbag module 41 and rear airbag module 51 in the present implementation. The below-knee portions of the occupant M are restrained to the identified positions of the below-knee portions from the front and rear, which makes it difficult for the lower legs of the occupant M to move in the fore-and-aft direction. Also, the waist of the occupant M is restrained by the seatbelt 22 of the seatbelt module 21. As a result thereof, the lower legs of the occupant M can be maintained in a state seated in the seat 5 at the time of a collision. The entirety of the lower legs of the occupant M can be restrained to the seated position.

Therefore, the lower legs of the occupant M do not move to a position where the lower legs come into contact with the toeboard due to a what is known as a submarine effect. There can also be reduced the possibility that moment damage will occur at the lower legs of the occupant M due to load received from the toeboard.

Also, since the lower legs of the occupant M can suitably be restrained to the riding position without moving forward, the position of the upper body of the occupant M does not readily drop lower on the seat 5. Increase in damage value of the upper body due to the position of the upper body of the occupant M dropping lower can effectively be suppressed. The upper body can also suitably be protected.

As a result thereof, not only the lower legs of the occupant M but also the upper body can suitably be protected by the occupant protection device 10 according to the present implementation, for example, in combination with the seatbelt module 21 to restrain the occupant M with the seated position before a collision as a reference. An advanced exact protection effect for the occupant M can be obtained, which is not obtained in the related art.

In particular, since both below-knee portions of the occupant M are separately restrained by the left and right pair of the front airbag module 41 and the left and right pair of the rear airbag module 51, even when the seated posture of the occupant M is poor, both below-knee portions of the occupant M can individually be restrained in a stable manner against inertial force received from the thigh. Holding of the left-side below-knee portion and holding of the right-side below-knee portion do not interfere. Also, even when the below-knee portion attempts to turn on the ankle, turning thereof can be suppressed, and both below-knee portions of the occupant M can stably be restrained. The behavior of the lower legs of the occupant M at the time of a collision can be suppressed.

Also, the controller 100 according to the present implementation identifies and supports the positions of the lower legs of the occupant M actually seated in the seat 5 based on the detection signals of the sensor modules 61, 71, 81, and 91, and identifies the positions of the lower legs.

Accordingly, even in the cases where the occupants M seated in the seat 5 have different body types, physiques, or seated postures, the positions of the lower legs according to each of the body type, physique, and seated posture are identified, and each occupant M can be supported in the identified positions of the lower legs thereof. Advanced protection of the occupant M, regardless of the body type, physique, and seated posture of the occupant M, can be expected.

Thus, the lower leg portions of the occupant M are supported in the identified positions of the lower leg portions, whereby more exact protection of the occupant M can be expected, which is not obtained the occupant protection device 10 according to the related art.

Also, the front airbag module 41 and left and right pair of rear airbag module 51 according to the present implementation restrain two portions including at least the knees out of the knees, shins, and ankles as the below-knee portions, which makes it difficult for the knees to ankles of the occupant M to move back and forth, or for the shins to turn on the ankles, at the time of a collision. The knees do not readily move not only in the fore-and-aft direction but also in the vertical and horizontal directions. As a result of the positions of the knees being restrained in the three-axial directions, for example, restraining the waist as well by the seatbelt module 21 enables the entirety of the lower legs of the occupant M to be firmly restrained so as not to deviate from the seated position. Thus, the entirety of the lower legs of the occupant M can be restrained at the position thereof before the collision. On the other hand, if the airbag modules for lower legs are simply expanded from the instrument panel, there remains space at the feet on the lower side of the expanded airbag module for lower legs, where no airbag module is expanded. There is a possibility due to impact at the time of a collision, or the like that the ankles and shins of the occupant M will move forward through that space. Such a possibility can be eliminated in the present implementation.

Also, the occupant protection device 10 according to the present implementation can accurately identify the positions of the front of the below-knee portions of the occupant M seated in the seat 5 using the pair of seat front sensor modules 61 and computation of triangulation. Moreover, providing the pair of seat front sensor modules 61 to a structural object in the vehicle around the seat 5 makes it difficult for another object to become interposed between the pair of seat front sensor modules 61 and the below-knee portions of the occupant M, which makes it difficult to prevent the positions of the below-knee portions from being identified. This is also true regarding the pair of seat rear sensor modules 71.

Also, the occupant protection device 10 according to the present implementation includes the pair of seat front sensor modules 51, pair of seat rear sensor modules 71, seated position sensor module 81, and body pressure distribution sensor module 91 as the sensor modules. According to such a combination of the sensor modules, the absolute positions of the below-knee portions of the occupant M within the cabin 4 can be identified without disposing a sensor around the seat 5 in a protruding manner, which enables the sensor modules not to hinder driving or embarking/disembarking of the occupant M.

In particular, employing noncontact sensors, such as the infrared sensor 52, as the seat front sensor modules 61 or seat rear sensor modules 71 eliminates necessity to provide contact-type sensors around the seat 5. Thus, an area around the seat 5 does not readily become cluttered, as it would in a case of using contact-type sensors.

Second Implementation

Next, an occupant protection device 10 according to a second implementation of the present invention will be described. The occupant protection device 10 according to the second implementation differs in the configurations and control of the movable front airbag module 41 and movable rear airbag module 51 in comparison with those in the first implementation. The configurations other than those are the same as the configurations of the first implementation, and are denoted with the same reference numerals, and illustration and description thereof will be omitted.

Figure 8:
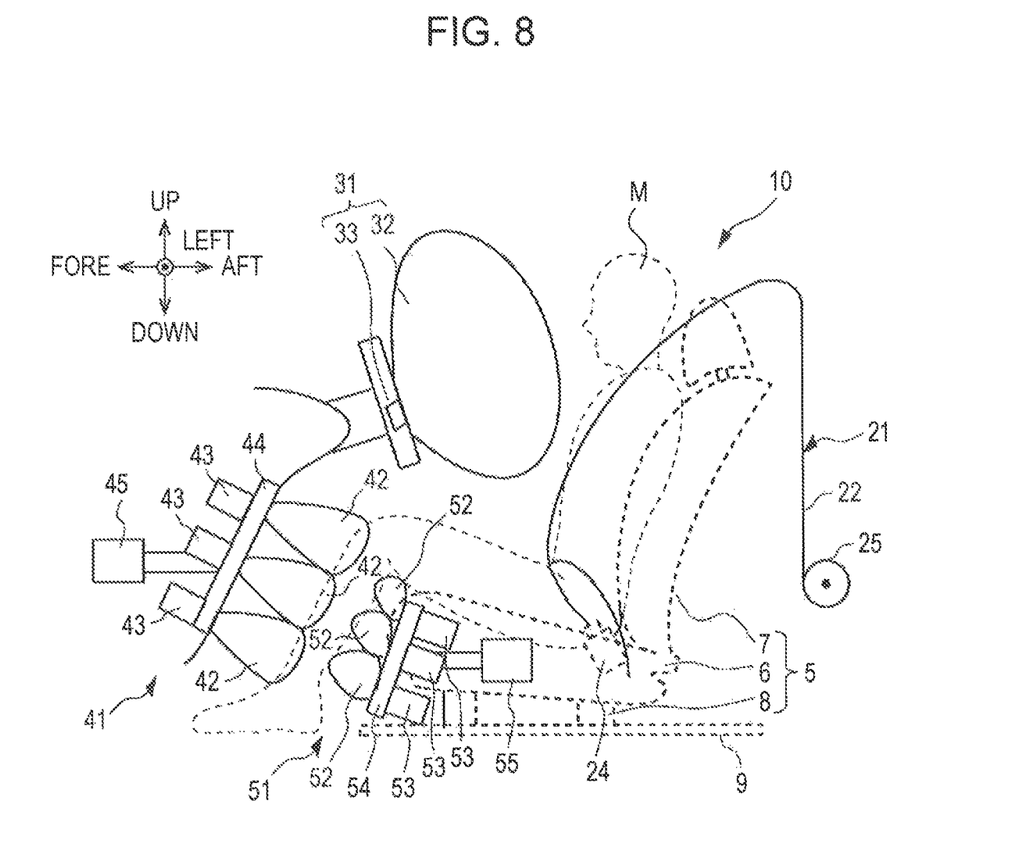
FIG. 8 is an explanatory diagram of a front airbag module and a rear airbag module, according to a second implementation.

FIG. 8 is an explanatory diagram of the front airbag module 41 and rear airbag module 51 according to the second implementation. The movable front airbag module 41 includes multiple front lower airbags 42, multiple front lower inflators 43, a front movable plate 44, and a front actuator 45.

The multiple front lower airbags 42 and multiple front lower inflators 43 are arrayed in the vertical direction on the front movable plate 44 which is longer in the vertical direction. The multiple front lower inflators 43 are individually connected with the controller 100. The multiple front lower inflators 42 can individually be expanded by the multiple front lower inflators 43. The multiple front lower inflators 43 may individually adjust the amount of injection. The front lower airbags 42 may have a generally U-letter shape with a cross section wrapping part of the below-knee portions from the front, left, and right sides.

The front movable plate 44 and front actuator 45 of the front airbag module 41 are disposed in the same way as those in the first implementation. The front movable plate 44 has, for example, a rectangular plate shape which is longer in the horizontal direction, and is provided movable in a direction toward the front face of the seat 5 from the lower portion of the instrument panel.

The movable rear airbag module 51 includes multiple rear airbags 52, multiple rear inflators 53, a rear movable plate 54, and a rear actuator 55. The multiple rear airbags 52 and multiple rear inflators 53 are arrayed in the vertical direction on the rear movable plate 54 which is longer in the vertical direction. The multiple rear inflators 53 are individually connected with the controller 100. The multiple rear inflators 52 can individually be expanded by the multiple rear inflators 53. The multiple rear inflators 53 may individually adjust the amount of injection. The rear airbags 52 may have a generally U-letter shape with a cross section wrapping part of the below-knee portions from the front, left, and right sides.

The rear movable plate 54 and rear actuator 55 of the rear airbag module 51 are disposed in the same way as those in the first implementation. The rear movable plate 54 has, for example, a rectangular plate shape which is longer in the horizontal direction, and is provided movable backwards from the front edge of the cushion part 6.

Figure 9:
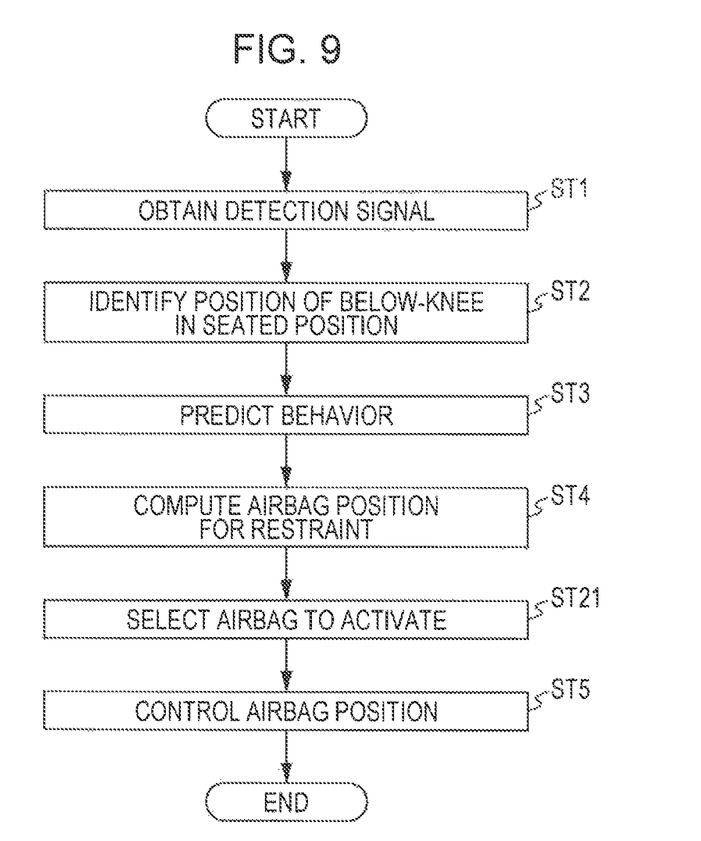
FIG. 9 is a flowchart illustrating adjustment control by a controller.

FIG. 9 is a flowchart illustrating adjustment control by the controller 100. The controller 100 executes the adjustment control processing in FIG. 9 during normal driving or at the time of collision prediction.

After identifying the seated position of the occupant M and so forth in step ST3, the controller 100 computes the fore-and-aft position of the movable front airbag module 41, and the fore-and-aft position of the rear airbag module 51 (step ST4).

Also, the controller 100 selects the front lower airbag 42 to be expanded at the front airbag module 41 according to the identified heights of the front of the below-knee portions (e.g., knee and shin) (step ST21). For example, in the case that the identified positions of the knees are low, the controller 100 selects the lower two front lower airbags 42. Also, in the case that the identified positions of the knees are high, the controller 100 selects all three front lower airbags 42.

Also, the controller 100 selects the rear airbag 52 to be expanded at the rear airbag module 51 according to the identified heights of the rear faces of the below-knee portions (e.g., knee and shin) (step ST21). For example, in the case that the identified positions of the below-knee portions are short, the controller 100 selects the upper two rear airbags 52. Also, in the case that the identified positions of the below-knee portions are long, the controller 100 selects all three rear airbags 52. The controller 100 holds information identifying the selected airbags 42 and 52.

Figure 10:
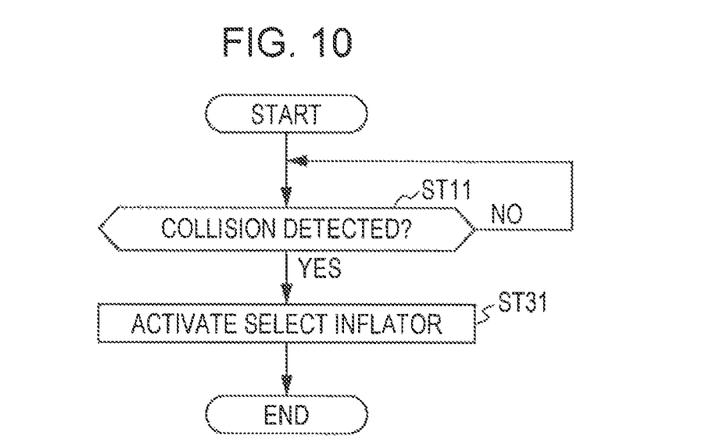
FIG. 10 is a flowchart illustrating control at the time of a collision by the controller.

FIG. 10 is a flowchart illustrating control at the time of a collision by the controller 100. The controller 100 executes the control processing in FIG. 10 at the time of detection of a collision.

Upon having detected a collision (step ST11), the controller 100 outputs an activation signal to the retractor 25 and the selected inflators 33, 43, and 53 (step ST31).

At this time, the controller 100 outputs the activation signal to only the inflator corresponding to the selected front lower airbag 42 of the multiple front lower inflators 43 of the front airbag module 41 based on selection information stored beforehand.

Also, the controller 100 outputs the activation signal to only the inflator corresponding to the selected rear airbag 52 of the multiple rear inflators 53 of the rear airbag module 51 based on the selection information stored beforehand.

As described above, the occupant protection device 10 according to the present implementation has the following advantages in addition to the advantages of the first implementation.

Specifically, the occupant protection device 10 according to the present implementation selects the front lower airbag 42 to be expanded regarding the front airbag module 41 according to the identified vertical positions of the below-knee portions (e.g., knee and shin), and selects the rear airbag 52 to be expanded regarding the rear airbag module 51. Accordingly, for example, males and females, who greatly differ in below-knee length, can suitably be restrained by an airbag corresponding to the length of the individual below-knee portions (e.g., shin). The expanded ranges of the airbags 42 and 52 can be adjusted in the fore-and-aft direction by the movable plates 44 and 54 which are movable back and forth, and can be adjusted in the vertical direction by selection of the multiple airbags 42 and 52 arrayed vertically.

Also, since the size of each of the airbags 42 and 52 can be reduced, the size of each of the inflators 43 and 53 does not have to be increased. The below-knee portions can firmly be restrained using the small inflators 43 and 53. High resistance and high holding power is continuously obtained by the expanded airbags 42 and 52.

Note that, in the case that the height of the cushion part 6 of the seat 5 is adjustable in the vertical direction, when the pair of seat rear sensor modules 71 are attached to the cushion part 6 of the seat 5, there is a possibility that the vertical positions of the below-knee portions (e.g., knee and shin) within the cabin 4 will become unclear. In this case, the height of the cushion part 6 may be detected by the seated position sensor module 81, and the relative positions of the below-knee portions as to the seat 5 identified based on the detection signals of the pair of seat rear sensor modules 71 have to be corrected to absolute positions according to the detected height of the cushion part 6. Thus, the absolute positions in the cabin 4 can be computed.

Third Implementation

Next, an occupant protection device 10 according to a third implementation of the present invention will be described. The occupant protection device 10 according to the third implementation differs in the configurations and control of the movable front airbag module 41 and movable rear airbag module 51 in comparison with those in the second implementation. Other configurations are the same as the configurations of the second implementation and are denoted with the same reference numerals, and illustration and description thereof will be omitted.

Figure 11:
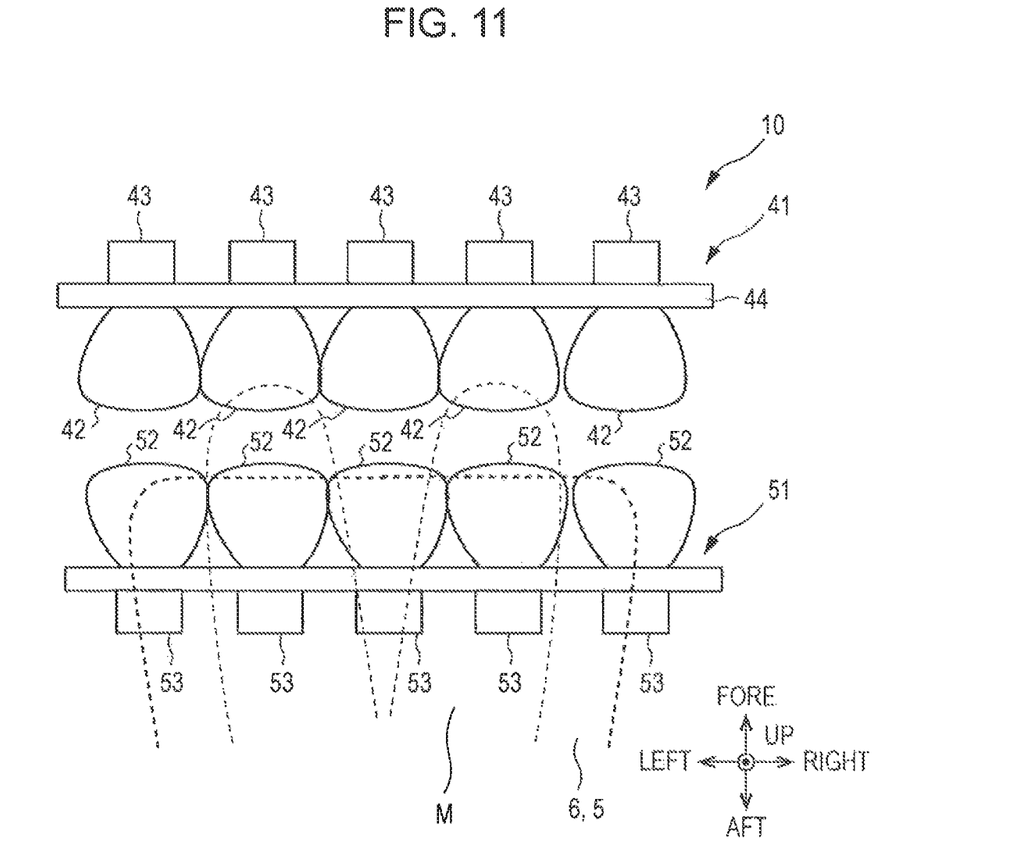
FIG. 11 is an explanatory diagram of a front airbag module and a rear airbag module, according to a third implementation.

FIG. 11 is an explanatory diagram of the front airbag module 41 and rear airbag module 51 according to the third implementation. The movable front airbag module 41 includes multiple front lower airbags 42, multiple front lower inflators 43, a front movable plate 44, and a front actuator 45.

The multiple front lower airbags 42 and multiple front lower inflators 43 are arrayed in the horizontal direction on the front movable plate 44 which is longer in the horizontal direction. The front lower airbags 42 may have, for example, a vertically long shape whereby the entirety of the front of the below-knee portions can be restrained.

The movable rear airbag module 51 includes multiple rear airbags 52, multiple rear inflators 53, a rear movable plate 54, and a rear actuator 55. The multiple rear airbags 52 and multiple rear inflators 53 are arrayed in the horizontal direction on the rear movable plate 54 which is longer in the horizontal direction. The rear airbags 52 may have a vertically long shape whereby the entirety of the rear of the below-knee portions can be restrained, for example.

The controller 100 executes the adjustment control processing in FIG. 9 during normal driving or at the time of collision prediction. After identifying the seated position of the occupant M and so forth in steps ST1 to ST3, the controller 100 computes the fore-and-aft position of the movable front airbag module 41, and the fore-and-aft position of the rear airbag module 51 (step ST4).

Also, the controller 100 selects the front lower airbag 42 to be expanded at the front airbag module 41 according to the identified horizontal positions of the front of the below-knee portions (e.g., knee and shin) (step ST21). At this time, the controller 100 may select not only the front lower airbag 42 on the front sides of the below-knee portions but also the front lower airbag 42 adjacent to the left and right thereof.

Also, the controller 100 selects the rear airbag 52 to be expanded at the rear airbag module 51 according to the identified horizontal positions of the rear faces of the below-knee portions (e.g., knee and shin) (step ST21). At this time, the controller 100 may select not only the rear airbag 52 on the rear sides of the below-knee portions but also the rear airbag 52 adjacent to the left and right thereof. The controller 100 holds information identifying the selected airbags 42 and 52.

The controller 100 executes the control processing in FIG. 10 at the time of detection of a collision. Upon having detected a collision (step ST11), the controller 100 outputs an activation signal to the retractor 25 and the selected inflators 43 and 53 (step ST31).

At this time, the controller 100 outputs the activation signal to only the inflator corresponding to the selected front lower airbag 42 of the multiple front lower inflators 43 of the front airbag module 41 based on selection information stored beforehand.

Also, the controller 100 outputs the activation signal to only the inflator corresponding to the selected rear airbag 52 of the multiple rear inflators 53 of the rear airbag module 51 based on the selection information stored beforehand.

As described above, the occupant protection device 10 according to the present implementation has the following advantages in addition to the advantages of the first implementation.

Specifically, the occupant protection device 10 according to the present implementation selects the front lower airbag 42 to be expanded regarding the front airbag module 41 according to the identified horizontal positions of the below-knee portions (e.g., knee and shin), and selects the rear airbag 52 to be expanded regarding the rear airbag module 51. Accordingly, occupants M with different horizontal positions of the below-knee portions can each suitably be restrained by the airbags 42 and 52 corresponding to the horizontal positions of the below-knee portions (e.g., knee and shin). The multiple expanded ranges of the airbags 42 and 52 can be adjusted in the fore-and-aft direction by the movable plates 44 and 54 which are movable back and forth, and can be adjusted in the horizontal direction by the multiple airbags 42 and 52 arrayed horizontally.

Also, since the size of each of the airbags 42 and 52 can be reduced, the size of each of the inflators 43 and 53 does not have to be increased. The below-knee portions can firmly be restrained using the small inflators 43 and 53. High drag and high holding power is continuously obtained by the expanded airbags 42 and 52.

Note that, in the case that the cushion part 6 of the seat 5 is adjustable in the horizontal direction, when the pair of seat rear sensor modules 71 are attached to the cushion part 6 of the seat 5, there is a possibility that the horizontal positions of the below-knee portions (e.g., knee and shin) within the cabin 4 becomes unclear. In this case, the horizontal position of the cushion part 6 has to be detected by the seated position sensor module 81, and the relative positions of the below-knee portions as to the seat 5 identified based on the detection signals of the pair of seat rear sensor modules 71 have to be corrected to absolute positions according to the detected horizontal position of the cushion part 6. Thus, the absolute positions in the cabin 4 can be computed.

Also, the second and third implementations may be combined. Specifically, for example, the multiple front lower airbags 42 may be arrayed in a matrix shape in the vertical and horizontal directions at the front airbag module 41. In this case, the controller 100 has to identify the positions in the vertical direction and the positions in the horizontal direction of the below-knee portions, and has to select the front lower airbag 42 in a position corresponding to the knees according to this, and the front lower airbag 42 on the lower side thereof.

Though the above implementations are an example of preferable implementations of the present invention, the present invention is not restricted to these, and various modifications or changes may be made without departing from the essence of the present invention.

There are provided the left and right pair of front airbag modules 41 and the left and right pair of rear airbag modules 51 as to the single seat 5 in the above implementations.

In addition to this, for example, there may be provided a single front airbag module 41 common to the right and left, and a single rear airbag module 51 common to the right and left as to the single seat 5. Also, there may be provided any one of the front airbag module 41 and rear airbag module 51. The number of airbag modules to restrain the lower legs of the occupant M as to the single seat 5 may be three or more. Even in these cases, devising the expanded shapes of the airbags 42 and 52 enables the airbags 42 and 52 to function so as to restrain or hold the lower legs of the seated occupant M in the identified seated position.

There are provided the multiple types of sensor modules 61, 71, 81, and 91 as to the single seat 5 in the above implementations.

In addition to this, for example, one sensor module, for example, such as the seat front sensor module 61, may be provided to the single seat 5. Even in this case, not only the expanded state of the front airbag module 41 but also the expanded state of the rear airbag module 51 can be adjusted based on the identified positions of the below-knee portions.

The body pressure distribution sensor module 91 is provided to the cushion part 6 of the seat 5 in the above implementations.

In addition to this, for example, the body pressure distribution sensor module 91 may be provided to the floor surface in front of the seat 5. In this case, the body pressure distribution sensor module 91 can detect the heels and toes of a seated occupant. If the positions of the heels and knees can be identified, all positions of the below-knee portions can be identified by computation.

The invention claimed is:

1. An occupant protection device comprising:
one or more airbag modules comprising a lower leg airbag module having a lower leg airbag that expands toward at least one lower leg of an occupant seated in a seat of a vehicle;
a controller that controls the lower leg airbag module; and
one or more sensor modules comprising an occupant sensor module that includes a sensor that detects the occupant seated in the seat, wherein
the lower leg airbag has a stored state and an expanded state, the expanded state of the lower leg airbag being variable via the controller, and
the controller is connected with the occupant sensor module and identifies a position of at least one lower leg of the occupant seated in the seat based on a detection signal of the occupant sensor module, and controls the expanded state of the lower leg airbag to correspond with the identified position to support at least one lower leg of the occupant in the identified position.

2. The occupant protection device according to claim 1, wherein
the lower leg airbag module is a below-knee airbag module, and the lower leg airbag is a below-knee airbag that expands toward at least one below-knee portion of the occupant seated in the seat; and
the controller identifies a position of the at least one below-knee portion of the occupant seated in the seat as the position of at least one lower leg based on the detection signal of the sensor, and expands the below-knee airbag toward the identified position to support the at least one below-knee portion in the identified position.

3. The occupant protection device according to claim 1, comprising:
a plurality of lower leg airbag modules, comprising
a front lower leg airbag module having a front lower leg airbag that expands backward on the front side of the at least one lower leg of the occupant seated in the seat, and
a rear lower leg airbag module having a rear lower leg airbag that expands forward on the rear side of the at least one lower leg of the occupant seated in the seat,
wherein the controller identifies the position of at least one lower leg of the occupant seated in the seat based on the detection signal of the sensor, and expands the front lower leg airbag and the rear lower leg airbag respectively from the front and rear toward the identified position to restrain the at least one lower leg of the occupant in the identified position from the front and the rear.

4. The occupant protection device according to claim 3, wherein
the front lower leg airbag module and the rear lower leg airbag module restrain at least two portions of at least one lower leg of the occupant seated in the seat,
a first of the two portions includes the knees of the occupant, and
a second of the two portions includes the shins or the ankles of the occupant.

5. The occupant protection device according to claim 2, wherein
the one or more sensor modules includes a pair of sensors in the vicinity of the seat; and
the controller identifies the position of the at least one below-knee portion of the occupant seated in the seat by triangulation employing detection signals of the pair of sensors and the relative positions of the pair of sensors.

6. The occupant protection device according to claim 1, wherein
the one or more sensor modules includes an occupant sensor module selected from:
a sensor module that detects the positions of the front of the knees, shins, or ankles of the occupant seated in the seat,
a sensor module that detects the positions of the rear of the knees, shins, or ankles of the occupant seated in the seat,
a sensor module that detects the position of the seat within the vehicle cabin, and
a sensor module that detects a body pressure distribution of the occupant seated in the seat; and
the controller identifies the position of at least one lower leg of the occupant seated in the seat based on a detection signal of at least one occupant sensor module.

7. The occupant protection device according to claim 1, wherein the one or more sensor modules includes an occupant sensor module having a sensor that detects the position of at least one lower leg of the occupant in a noncontact manner.

8. The occupant protection device according to claim 7, wherein the sensor that detects the position of at least one lower leg of the occupant in a noncontact manner comprises an infrared sensor, an ultrasonic sensor, or an image sensor.

9. The occupant protection device according to claim 1, wherein the controller controls the expanded state of the lower leg airbag to correspond with the position of at least one lower leg of the occupant by adjusting a position of the lower leg airbag while in the stored state.

10. The occupant protection device according to claim 9, wherein the lower leg airbag module comprises a movable plate that supports the lower leg airbag, and the controller adjusts the position of the lower leg airbag while in the stored state by adjusting the position of the movable plate.

11. The occupant protection device according to claim 10, wherein controller adjusts the position of the movable plate in the fore-and-aft directions of the vehicle.

12. The occupant protection device according to claim 1, wherein the lower leg airbag module comprises a movable plate that supports the lower leg airbag, and the controller controls the expanded state of the lower leg airbag to correspond with the identified position of at least one lower leg of the occupant by adjusting the position of the movable plate.

13. The occupant protection device according to claim 12, wherein the controller adjusts the position of the movable plate in a state in which no collision is detected.

14. The occupant protection device according to claim 12, wherein the controller adjusts the position of the movable plate in a collision prediction state.

15. The occupant protection device according to claim 1, wherein the lower leg airbag module comprises an inflator for injecting gas into the lower leg airbag to inflate the airbag, and the controller controls the expanded state of the airbag to correspond with the identified position of at least one lower leg of the occupant by controlling the amount of gas injected by the inflator.

16. An occupant protection device comprising:
one or more airbag modules comprising at least two lower leg airbags that expand toward at least one lower leg of an occupant seated in a seat of a vehicle;
a controller that controls the lower leg airbags; and
one or more sensor modules comprising an occupant sensor module that includes a sensor that detects the occupant seated in the seat, wherein the lower leg airbags have stored states and expanded states, and the controller is connected with the occupant sensor module and identifies a position of at least one lower leg of the occupant seated in the seat based on a detection signal of the sensor, and controls one of the two lower leg airbags to expand to the expanded state to correspond with the identified position of at least one lower leg of the occupant, and controls the other of the two lower leg airbags to remain in the stored state.

17. The occupant protection device according to claim 16, wherein the at least two lower leg airbags are in a single airbag module.

18. An occupant protection device comprising:

one or more airbag modules comprising at least two lower leg airbags that expand toward at least one lower leg of an occupant seated in a seat of a vehicle;

a controller that controls the lower leg airbags; and one or more sensor modules comprising an occupant sensor module that includes a sensor that detects the occupant seated in the seat, wherein the lower leg airbags have stored states and expanded states, the controller is connected with the occupant sensor module and identifies a position of at least one lower leg of the occupant seated in the seat based on a detection signal of the sensor, and controls the two lower leg airbags to expand both airbags to the expanded states to correspond with the identified position of at least one lower leg of the occupant, the controller controls the two lower leg airbags to expand with offset timings.

19. The occupant protection device according to claim 18, wherein the at least two lower leg airbags are in two separate airbag modules.

* * * * *